US011521331B2

(12) United States Patent
Ye et al.

(10) Patent No.: US 11,521,331 B2
(45) Date of Patent: Dec. 6, 2022

(54) METHOD AND APPARATUS FOR GENERATING POSITION INFORMATION, DEVICE, AND MEDIUM

(71) Applicant: Beijing Baidu Netcom Science and Technology Co., Ltd., Beijing (CN)

(72) Inventors: Xiaoqing Ye, Beijing (CN); Xiao Tan, Beijing (CN); Hao Sun, Beijing (CN); Hongwu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 9 days.

(21) Appl. No.: 17/179,456

(22) Filed: Feb. 19, 2021

(65) Prior Publication Data

US 2021/0319579 A1 Oct. 14, 2021

(30) Foreign Application Priority Data

Apr. 9, 2020 (CN) .......................... 202010272803.8

(51) Int. Cl.
  *G06K 9/00* (2022.01)
  *G06T 7/593* (2017.01)
  (Continued)

(52) U.S. Cl.
  CPC ............ *G06T 7/593* (2017.01); *G06K 9/6256* (2013.01); *G06T 7/73* (2017.01); *G06V 20/49* (2022.01);
  (Continued)

(58) Field of Classification Search
  None
  See application file for complete search history.

(56) References Cited

U.S. PATENT DOCUMENTS

2014/0307044 A1 10/2014 Piyush et al.
2017/0294002 A1* 10/2017 Jia .......................... G06T 5/006
(Continued)

FOREIGN PATENT DOCUMENTS

| JP | 2008287379 A | 11/2008 |
|---|---|---|
| JP | 2016519822 A | 7/2016 |
| JP | 2019526878 A | 9/2019 |

OTHER PUBLICATIONS

Maddern, Will, et al. "1 year, 1000 km: The Oxford RobotCar dataset." The International Journal of Robotics Research 36.1 (2017): 3-15. (Year: 2017).*

(Continued)

*Primary Examiner* — Sean M Conner
(74) *Attorney, Agent, or Firm* — Nixon Peabody LLP

(57) ABSTRACT

Embodiments of the present disclosure disclose a method and apparatus for generating position information, a device and a medium. A specific embodiment of the method includes: acquiring an image and vehicle position information, wherein the image includes a target element; inputting the image into a pre-established depth map generation model to obtain a first depth map, wherein the focal length of sample images of sample data used during the training of the model is a sample focal length; generating a second depth map based on the sample focal length, the first depth map, and an estimated focal length of the image; determining depth information of the target element according to element position information of the target element in the image and the second depth map; and generating position information of the target element based on the vehicle position information and the depth information of the target element.

12 Claims, 6 Drawing Sheets

(51) Int. Cl.
    *G06T 7/73*         (2017.01)
    *G06K 9/62*         (2022.01)
    *G06V 20/40*       (2022.01)

(52) U.S. Cl.
    CPC ............... *G06T 2207/20081* (2013.01); *G06T 2207/30252* (2013.01)

(56) References Cited

U.S. PATENT DOCUMENTS

| | | | |
|---|---|---|---|
| 2019/0213481 | A1 | 7/2019 | Clement et al. |
| 2021/0118184 | A1* | 4/2021 | Pillai ..................... G06T 7/50 |
| 2021/0306614 | A1* | 9/2021 | Wiman ................ H04N 13/275 |

OTHER PUBLICATIONS

Huang, Tao, et al. "Unsupervised monocular depth estimation based on residual neural network of coarse-refined feature extractions for drone." Electronics 8.10 (2019): 1179. (Year: 2019).*

European Patent Office; Extended European Search Report for Application No. 211594775, dated Jul. 27, 2021 (8 pages).

Shing Yan Loo et al., "CNN-SVO: Improving the Mapping in Semi-Direct Visual Odometry Using Single-Image Depth Prediction"; Arxiv.org, Cornell University, 201 Olin Library, Ithaca, New York; Oct. 2, 2018; XP081054837 (6 pages).

Jingyuan Huang et al.; "Simple 3D Reconstruction of Single Indoor Image with Perspective Cues"; Computer and Robot Vision, pp. 140-147; Canadian Conference on CRV '09; IEEE, Piscataway, New Jersey; May 25, 2009; XP031524558; ISBN: 978-0-7695-3651-4 (8 pages).

Carvalho, M. et al.; "On Regression Losses for Deep Depth Estimation"; 2018 25$^{th}$ IEEE International Conference on Image Processing (ICIP), pp. 2915-2919; IEEE, Oct. 7, 2018; XP033454885; DOI: 10.1109/ICIP.2018.8451312 (5 pages).

Tao Huang et al.; "Unsupervised Monocular Depth Estimation Based on Residual Neural Network of Coarse-Refined Feature Extractions for Drone"; Electronics, vol. 8, No. 10, p. 1179; Oct. 17, 2019; XP055825199; DOI: 10.3390/electronics8101179 (20 pages).

* cited by examiner

METHOD AND APPARATUS FOR GENERATING POSITION INFORMATION, DEVICE, AND MEDIUM

CROSS-REFERENCE TO RELATED APPLICATIONS

This application claims priority to Chinese Patent Application No. 202010272803.8, filed with the China National Intellectual Property Administration (CNIPA) on Apr. 9, 2020, the contents of which are incorporated herein by reference in their entirety.

TECHNICAL FIELD

Embodiments of the present disclosure relate to the field of computer technology, and specifically to a method and apparatus for generating position information, a device and a medium.

BACKGROUND

In an electronic map, the positions of elements such as speed limit signs, notice signs, and traffic lights play a non-ignorable role in the update of the map. The accuracy of element position calculation has a huge impact on the update of map data. In an actual application scenario, a certain element may only be detected in a single image during certain information acquisition, but not in previous and subsequent images. In view of this situation, the distance of the element may be roughly estimated at the present stage based on empirical knowledge according to the area of the elements in the image. The latitude and longitude of this element are then calculated based on the positioning data of vehicles in the front and rear frames. However, the image sizes of the elements at the same distance are different under lenses with different focal lengths. Therefore, the estimation of the distance according to the area of the elements has large error and low accuracy.

SUMMARY

Embodiments of the present disclosure provide a method and apparatus for generating position information, a device and a medium.

In a first aspect, embodiments of the present disclosure provide a method for generating position information, comprising: acquiring an image captured by a vehicle-mounted image capture device and vehicle position information during capturing the image, wherein the image comprises a target element belonging to a preset category; inputting the image into a pre-established depth map generation model to obtain a first depth map for the image, wherein the focal length of sample images of sample data used during the training of the depth map generation model is a sample focal length; generating a second depth map based on the sample focal length, the first depth map, and an estimated focal length of the image, wherein the estimated focal length of the image is generated based on the size of the image; determining depth information of the target element according to element position information of the target element in the image and the second depth map; and generating position information of the target element based on the vehicle position information and the depth information of the target element.

In some embodiments, the method further comprises: determining a confidence of the depth information of the target element based on the second depth map and the depth information of the target element; and generating comprehensive position information of the target element based on at least one confidence and at least one position information obtained for the target element.

In some embodiments, the depth map generation model is obtained by training in the following way: acquiring a set of sample data, wherein the sample data comprises sample images and sample depth maps corresponding to the sample images; and obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

In some embodiments, the generating a second depth comprises: determining a ratio between the estimated focal length and the sample focal length; and calculating a product of the ratio and the first depth map, and using the calculation result as the second depth map.

In some embodiments, the vehicle position information comprises latitude and longitude; and the generating position information of the target element comprises: determining an angle between a straight line formed by a center point of the target element and a center point of a bottom edge of the image and the bottom edge of the image as a first angle; determining an angle between the driving direction of the vehicle and the direction north as a second angle; determining a north angle of the target element according to the first angle and the second angle; and calculating the latitude and longitude of the target element according to the north angle of the target element, the latitude and longitude, and the depth information of the target element.

In a second aspect, embodiments of the present disclosure provide an apparatus for generating position information, comprising: an acquisition unit, configured to acquire an image captured by a vehicle-mounted image capture device and vehicle position information during capturing the image, wherein the image comprises a target element belonging to a preset category; an input unit, configured to input the image into a pre-established depth map generation model to obtain a first depth map for the image, wherein the focal length of sample images of sample data used during the training of the depth map generation model is a sample focal length; a first generation unit, configured to generate a second depth map based on the sample focal length, the first depth map, and an estimated focal length of the image, wherein the estimated focal length of the image is generated based on the size of the image; a first determination unit, configured to determine depth information of the target element according to element position information of the target element in the image and the second depth map; and a second generation unit, configured to generate position information of the target element based on the vehicle position information and the depth information of the target element.

In some embodiments, the apparatus further comprises: a second determination unit, configured to determine a confidence of the depth information of the target element based on the second depth map and the depth information of the target element; and a third generation unit, configured to generate comprehensive position information of the target element based on at least one confidence and at least one position information obtained for the target element.

In some embodiments, the depth map generation model is obtained by training in the following way: acquiring a set of sample data, wherein the sample data comprises sample images and sample depth maps corresponding to the sample images; and obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

In some embodiments, the first generation unit is further configured to: determine a ratio between the estimated focal length and the sample focal length; and calculate a product of the ratio and the first depth map, and use the calculation result as the second depth map.

In some embodiments, the vehicle position information comprises latitude and longitude; and the second generation unit is further configured to: determine an angle between a straight line formed by a center point of the target element and a center point of a bottom edge of the image and the bottom edge of the image as a first angle; determine an angle between the driving direction of the vehicle and the direction north as a second angle; determine a north angle of the target element according to the first angle and the second angle; and calculate the latitude and longitude of the target element according to the north angle of the target element, the latitude and longitude, and the depth information of the target element.

In a third aspect, embodiments of the present disclosure provide an electronic device, comprising: one or more processors; and a storage apparatus, storing one or more programs thereon, wherein the one or more programs, when executed by the one or more processors, cause the one or more processors to implement the method provided by the first aspect.

In a forth aspect, embodiments of the present disclosure provide a computer-readable medium, storing a computer program thereon, wherein the program, when executed by a processor, causes the processor to implement the method provided by the first aspect.

In the method and apparatus for generating position information according to the embodiments of the present disclosure, first, an image captured by a vehicle-mounted image capture device and including a target element, and vehicle position information during capturing the image may be acquired. Second, the image is input into a pre-established depth map generation model to obtain a first depth map for the image, wherein the focal length of sample images of sample data used during the training of the depth map generation model is a sample focal length. After that, a second depth map is generated based on the sample focal length, the first depth map, and an estimated focal length of the image. Then, depth information of the target element is determined according to element position information of the target element in the image and the second depth map. Finally, position information of the target element is generated based on the vehicle position information and the depth information of the target element. Therefore, the position information of the target element in the image is generated based on the image captured by the vehicle-mounted image capture device and the vehicle position information during capturing the image. When the position information of the target element is being generated, the influence of the focal length on the depth is fully considered, so the generated position information can be more accurate.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
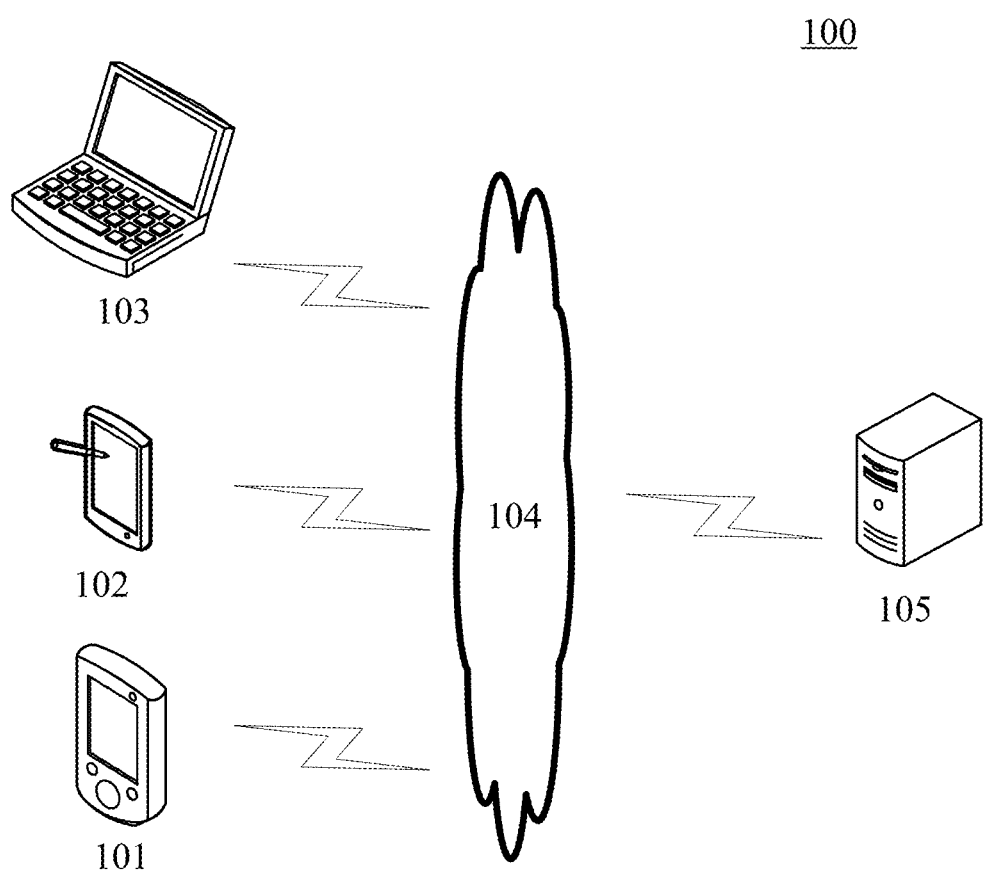
FIG. 1 is a diagram of an exemplary system architecture to which an embodiment of the present disclosure may be applied.

FIG. 1 shows an exemplary system architecture 100 to which a method for generating position information or an apparatus for generating position information according to the embodiments of the present disclosure may be applied.

As shown in FIG. 1, the system architecture 100 may include a terminal device 101, 102, and 103, a network 104, and a server 105. The network 104 serves as a medium providing a communication link between the terminal device 101, 102, or 103 and the server 105. The network 104 may include various types of connections, such as wired or wireless communication links, or optical fiber cables.

A user may use the terminal device 101, 102 or 103 to interact with the server 105 through the network 104 to receive or send messages. The terminal device 101, 102 or 103 may be installed with various communication client applications, such as image processing software, electronic map generation software, web browser applications, instant messaging tools, E-mail clients, and social platform software.

The terminal device 101, 102 or 103 may be hardware or software. When the terminal device 101, 102, or 103 is hardware, the terminal device may be various electronic devices with an information generating function, including but not limited to a smart phone, a tablet computer, a laptop computer and a desktop computer. When the terminal device 101, 102, or 103 is software, the terminal device may be installed in the above-listed electronic devices. The terminal device may be implemented as a plurality of software programs or software modules (for example, used to provide distributed services), or as a single software program or software module. Specific limitations are not given here.

The server 105 may be a server that provides various services, for example, a back-end server that provides support for information displayed on the terminal device 101, 102, or 103. The back-end server may analyze the received data such as images and vehicle position information, and feed processing results (such as position information of a target element) back to the terminal device.

It should be noted that the server 105 may be hardware or software. When the server 105 is hardware, the server may be implemented as a distributed server cluster composed of a plurality of servers, or as a single server. When the server 105 is software, the server may be implemented as a plurality of software programs or software modules (for example, used to provide distributed services), or as a single software program or software module. Specific limitations are not given here.

It should be understood that the numbers of the terminal devices, networks, and servers in FIG. 1 are merely illustrative. Any number of terminal devices, networks and servers may be configured according to actual requirements.

It should be noted that the method for generating position information according to the embodiments of the present disclosure may be executed by the terminal device 101, 102 or 103, or by the server 105. Accordingly, the apparatus for generating position information may be arranged in the terminal device 101, 102 or 103, or in the server 105.

Figure 2:
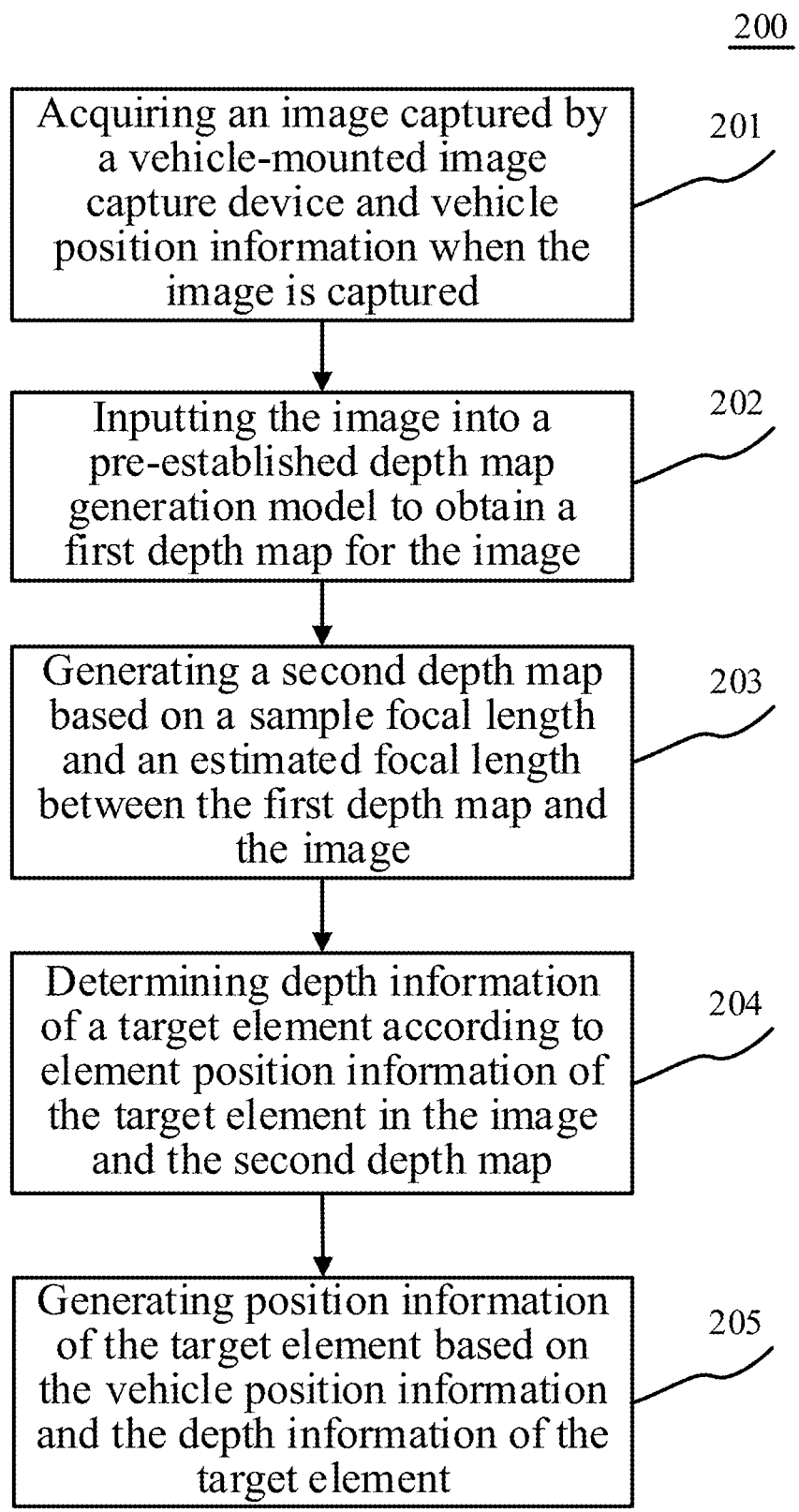
FIG. 2 is a flowchart of an embodiment of a method for generating position information according to the present disclosure.

Continuing to refer to FIG. 2, a flow 200 of an embodiment of a method for generating position information according to the present disclosure is shown. The method for generating position information includes the following steps:

Step 201: acquiring an image captured by a vehicle-mounted image capture device and vehicle position information during capturing the image.

In this embodiment, the execution subject (for example, the terminal device 101, 102, or 103 or the server 105 shown in FIG. 1) of the method for generating position information may acquire, in a wired connection manner or a wireless connection manner, the image captured by the vehicle-mounted image capture device (for example, a camera) and the vehicle position information during capturing the image. As an example, the vehicle position information may include GPS (Global Positioning System) data. Here, the image may include a target element belonging to a preset category. Here, the element may refer to a map element, and the target element may refer to an element of a preset category among the map elements. For example, the preset category may include, but is not limited to, road traffic signs, traffic lights, and the like.

Step 202: inputting the image into a pre-established depth map generation model to obtain a first depth map for the image.

In this embodiment, the execution subject may input the image acquired in step 201 into the pre-established depth map generation model to obtain the first depth map for the input image. Here, the depth map generation model may be used to generate, according to the input single image, a depth map for the input single image. The depth map may be an image or an image channel containing information related to the distance from the surface of a scenario object of a viewpoint. Each pixel value of the depth map is the distance between a sensor and an object.

As an example, the depth map generation model may be obtained by training a preset set of sample data using a machine learning method. Here, the sample data in the set of sample data may include sample images and sample depth maps corresponding to the sample images. The focal lengths of the sample images of the sample data used during the training of the depth map generation model are sample focal lengths. The focal lengths of the sample images in the set of sample data may be the same. For example, the depth map generation model may be obtained by training through the following steps: S1, inputting a sample image of at least one sample data in the set of sample data into an initial machine learning model to obtain a predicted depth map corresponding to each sample image in the at least one sample image. Here, the initial machine learning model may be a neural network model that is not trained or not trained completely, such as a convolutional neural network, or a deep neural network. S2: comparing the predicted depth map corresponding to each sample image in the at least one sample image with the corresponding sample depth map. S3: determining, according to the comparison results, whether the initial machine learning model satisfies a preset condition. As an example, the preset condition may be that the value of a loss function is smaller than a preset threshold. For example, the loss function may be the difference between the predicted depth map and the sample depth map. S4: in response to determining that the initial machine learning model has reached a preset optimization goal, using the initial machine learning model as a trained depth map generation model. S5: in response to determining that the initial machine learning model does not satisfy the preset condition, adjusting network parameters of the initial machine learning model, using unused sample data to form a set of sample data, and continuing to execute the above training steps. As an example, the network parameters of the initial machine learning model may be adjusted by means of a back propagation algorithm (BP algorithm) and a gradient descent method (such as a small batch gradient descent algorithm). It should be noted that the back propagation algorithm and the gradient descent method are well-known technologies that are currently widely studied and applied, and will not be repeated here.

In some optional implementation modes of this embodiment, the execution subject used to train the depth map generation model may be the same as or different from the execution subject used to generate position information. The depth map generation model may be obtained by training in the following way:

First, a set of sample data is acquired.

In this implementation mode, the execution subject used to train the depth map generation model may acquire the set of sample data. Here, each sample data in the set of sample data may include a sample image and a sample depth map corresponding to the sample image.

Then, the depth map generation model is obtained by training using a pre-built loss function with the sample images in the set of sample data as input and the sample depth maps corresponding to the input sample images as desired output.

In this implementation mode, the execution subject used to train the depth map generation model may obtain the depth map generation model by training using the pre-built loss function with the sample images in the set of sample data as input and the sample depth maps corresponding to the input sample images as desired output. Here, the loss function may be a weighted sum of a first loss function, a second loss function and a third loss function. The first loss function may be obtained based on the model output and the desired output. The second loss function may be obtained based on the gradient of the model output and the gradient of the desired output. The third loss function may be obtained based on the similarity between the model output and the desired output.

As an example, the first loss function may be as follows:

$$L_{depth}=|y_{pred}-y_{gt}|$$

Where, depth represents the first loss function, $y_{pred}$ represents a predicted depth map output by the depth map generation model for the input sample image, and $y_{gt}$ represents a desired output corresponding to the input sample image.

The second loss function may be as follows:

$$L_{edge}=|(g_x^{pred}-g_x^{gt})+(g_y^{pred}-g_y^{gt})|$$

Where, $L_{edge}$ represents the second loss function, $g_x^{pred}$ and $g_y^{pred}$ respectively represent the gradients of the predicted depth map output by the depth map generation model for the input sample image along the X axis and the Y axis, $g_x^{gt}$ and $g_y^{gt}$ respectively represent the gradients of the desired output corresponding to the input sample image along the X axis and Y axis.

The third loss function may be as follows:

$$L_{ssim} = \frac{1-SSIM(y_{pred}, y_{gt})}{2}$$

Where, $L_{ssim}$ represents the third loss function, and SSIM $(y_{pred}, y_{gt})$ represents a structural similarity index between $y_{pred}$ and $y_{gt}$. Here, SSIM (structural similarity index) is an index that measures the similarity of two images. Here, when the first loss function, the second loss function and the third loss function are weighted, the weight may be set according to actual needs. When training the depth map generation model, this implementation mode comprehensively considers the differences in gradient, similarity and the like between the model output and the desired output. Therefore, the depth map generated by the trained depth map generation model is more accurate.

Step 203: generating a second depth map based on a sample focal length, the first depth map, and an estimated focal length of the image.

In this embodiment, the execution subject may first generate the estimated focal length of the image based on the size of the image acquired in step 201. Generally, when capturing an image, the focus has a certain correlation with the size of the image. Therefore, the focal length of the image can be estimated based on the size of the image. As an example, the estimated focal length may be obtained by multiplying the width of the image by a preset value. The preset value may be a value set by a technician according to actual experience. For example, the preset value is 0.85. For example, it is supposed that the size of the image is $W_1 \times H_1$, where $W_1$ represents the width of the image, and $H_1$ represents the height of the image. The estimated focal length of the image may be calculated by the following equation:

$$f_1=0.85*W_1$$

Where, $f_1$ represents the estimated focal length of the image.

As another example, the execution subject may determine the estimated focal length of the image based on a method of a multi-view motion restoration structure.

After that, the execution subject may generate the second depth map according to the sample focal length, the first depth map, and the estimated focal length of the image. Here, the technician may set the transformation relation between the sample focal length, the first depth map, the estimated focal length of the image and the second depth map according to actual experience. The transformation relation may be formulated by the technician based on statistics on a large number of sample focal lengths, first depth maps, estimated focal lengths of images, and second depth maps. In this way, the execution subject may generate the second depth map according to the set transformation relation, the sample focal length, the first depth map and the estimated focal length of the image.

In some optional implementation modes of this embodiment, step 203 may be implemented as follows.

First, the ratio between the estimated focal length and the sample focal length is determined.

In this implementation mode, the execution subject may calculate the ratio between the estimated focal length of the image and the sample focal length.

Then, the product of the ratio and the first depth map is calculated, and the calculation result is used as the second depth map.

In this implementation mode, the execution subject may calculate the product of the ratio and the first depth map, and use the calculation result as the second depth map. Specifically, the execution subject may calculate each depth value in the second depth map by the following equation:

$$depth_{real}=f_1/f_0*depth_{pred}$$

Where, $depth_{real}$ represents the depth value in the second depth map, $f_1$ represents the estimated focal length of the image, $f_0$ represents the sample focal length, and $depth_{pred}$ represents the depth value in the first depth map.

Step 204: determining depth information of a target element according to element position information of the target element in the image and the second depth map.

In this embodiment, the execution subject may first determine the element position information of the target element in the image. As an example, the execution subject may segment the image, and determine position information, that is, the element position information, of the target element in the image according to the segmentation result. As another example, the execution subject may perform image recognition on the image to recognize the target element in the image and a detection box of the target element, and determine the element position information of the target element in the image according to the detection box of the target element. Then, the execution subject may determine the depth information of the target element according to the element position information of the target element in the image and the second depth map. As an example, the execution subject may acquire a plurality of pixel values of a position corresponding to the position indicated by the element position information in the second depth map, and determine the depth information of the target element based on the plurality of pixel values acquired. For example, the pixel value that appears most frequently among the plurality of pixel values acquired may be selected as the depth information of the target element. For another example, an average value of the plurality of pixel values acquired may be used as the depth information of the target element.

Step 205: generating position information of the target element based on the vehicle position information and the depth information of the target element.

In this embodiment, based on the vehicle position information and the depth information of the target element, the execution subject may generate the position information of the target element in various ways. In practice, since the depth information of the target element can indicate the distance between the vehicle-mounted image capture device and the target element during capturing the image, the position information of the target element can be determined based on the vehicle position information and the depth information of the target element. For example, the weighted sum of the vehicle position information and the depth information of the target element on the X axis and the Y axis may be determined as the position information of the target element.

In some optional implementation modes of this embodiment, the vehicle position information may include the latitude and longitude of the vehicle. Step 205 may be specifically performed as follows:

First, the angle between a straight line formed by a center point of the target element and a center point of a bottom edge of the image and the bottom edge of the image is determined as a first angle.

In this implementation mode, the execution subject may first determine the center point of the target element. After that, the execution subject may calculate the angle between the straight line formed by the center point of the target element and the center point of the bottom edge of the image and the bottom edge of the image, which is an acute angle, and use the calculated angle as the first angle. In practice, the center point of the bottom edge of the image can be approximated as the position of the vehicle.

Second, the angle between the driving direction of the vehicle and the direction north is determined as a second angle.

In this implementation mode, the execution subject may determine the driving direction of the vehicle when the image and the vehicle position information are acquired, and calculate the angle between the driving direction of the vehicle and the direction north (that is, true north). After that, the execution subject may use the calculated angle as the second angle.

Then, a north angle of the target element is determined according to the first angle and the second angle.

In this implementation mode, the execution subject may determine the north angle of the target element according to the first angle and the second angle. As an example, the execution subject may use the sum of the first angle and the second angle as the north angle of the target element.

Finally, the latitude and longitude of the target element are calculated according to the north angle of the target element, the latitude and longitude, and the depth information of the target element.

In this implementation mode, the execution subject may calculate the longitude and latitude of the target element according to the north angle of the target element, the latitude and longitude in the vehicle position information, and the depth information of the target element.

Figure 3:
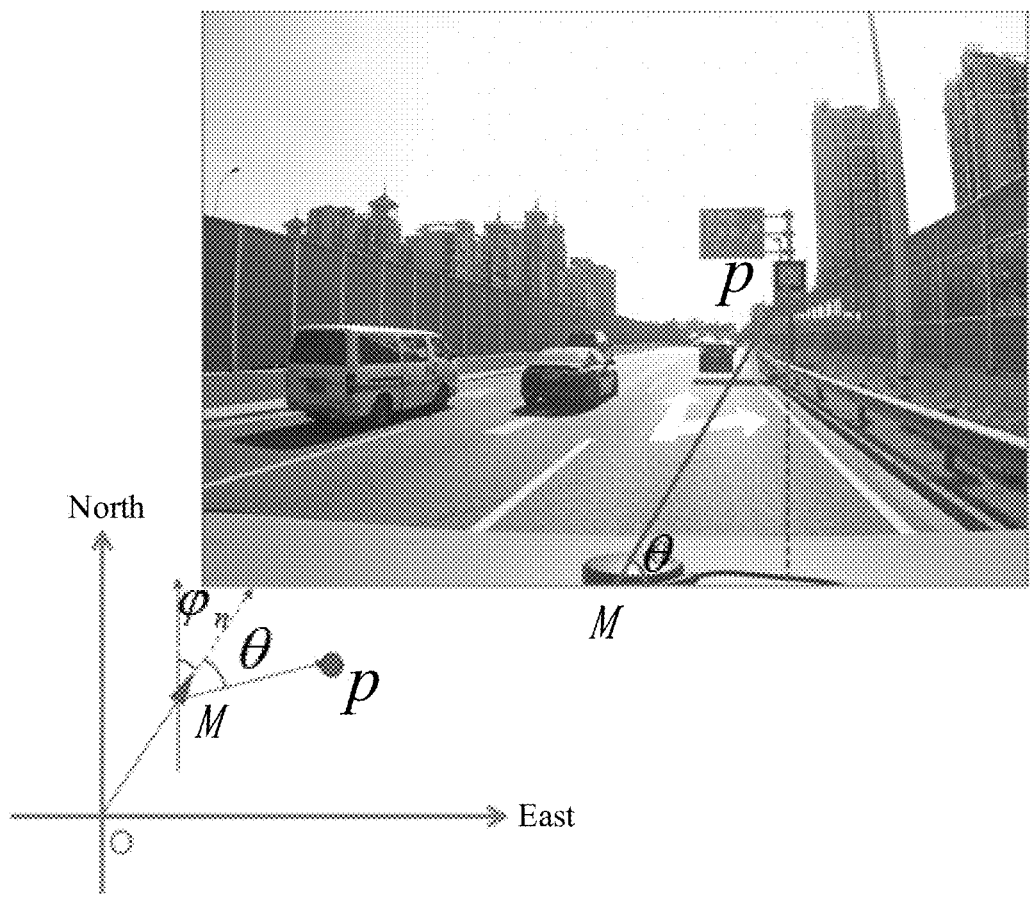
FIG. 3 is a schematic diagram of an example of calculating the latitude and longitude of a target element.

For example, as shown in FIG. 3, it is supposed that the center point of the target element is P(x,y), the center point of the bottom edge of the image is $$M\left(\frac{W_1}{2}, H_1\right),$$

the first angle between the straight line formed by the center point of the target element and the center point of the bottom edge of the image and the bottom edge of the image is θ, the second angle between the driving direction of the vehicle and the direction north is $\varphi_n$, the north angle of the target element is ($\varphi_n$+θ), the latitude and longitude in the vehicle position information are ($Car_x^{GPS}$, $Car_y^{GPS}$), and the depth information of the target element is $depth_{mark}$. Then, the latitude and longitude of the target element may be determined in the following ways:

$$P_x^{GPS} = Car_x^{GPS} + depth_{mark} * \sin(\varphi_n + \theta)$$

$$P_y^{GPS} = Car_y^{GPS} + depth_{mark} * \cos(\varphi_n + \theta)$$

Where, $P_x^{GPS}$ represents the longitude of the target element, and $P_y^{GPS}$ represents the latitude of the target element.

Figure 4:
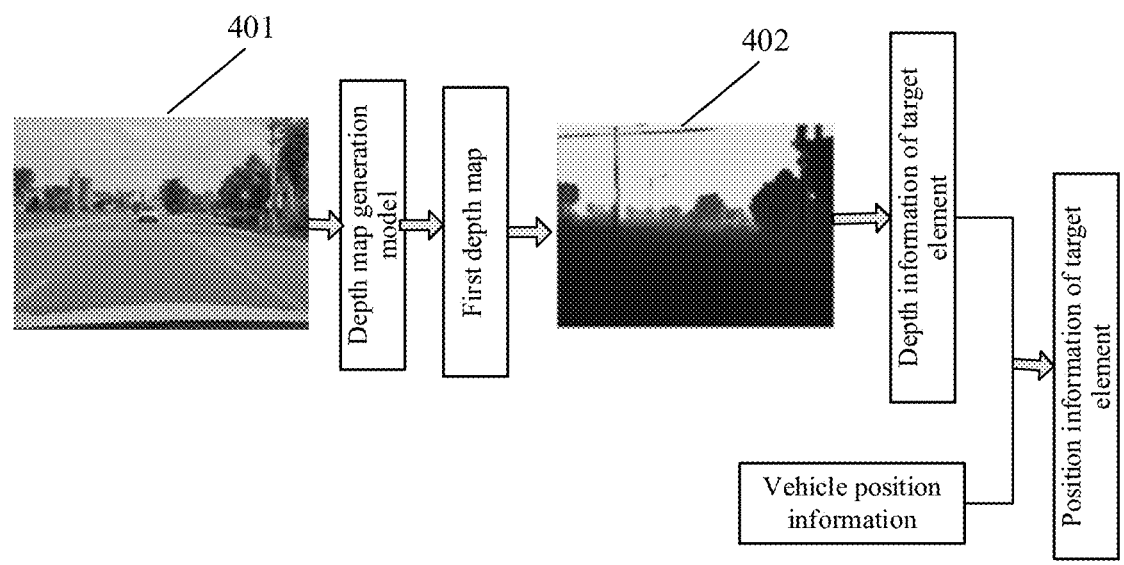
FIG. 4 is a schematic diagram of an application scenario of the method for generating position information according to the present disclosure.

Continuing to refer to FIG. 4, FIG. 4 is a schematic diagram of an application scenario of the method for generating position information according to this embodiment. In the application scenario of FIG. 4, the terminal device may first acquire an image 401 captured by a vehicle-mounted image capture device and vehicle position information during capturing the image. Second, the terminal device may input the image 401 into a pre-established depth map generation model to obtain a first depth map for the image. Next, a second depth map 402 is generated based on a sample focal length, the first depth map, and an estimated focal length of the image 401. Then, depth information of a target element is determined according to element position information of the target element in the image and the second depth map. Finally, position information of the target element is generated based on the vehicle position information and the depth information of the target element.

The method provided by the above embodiment of the present disclosure may generate the position information of the target element in the image based on the image captured by the vehicle-mounted image capture device and the vehicle position information during capturing the image. When the position information of the target element is generated, the influence of the focal length on the depth is fully considered, so the generated position information can be more accurate.

Figure 5:
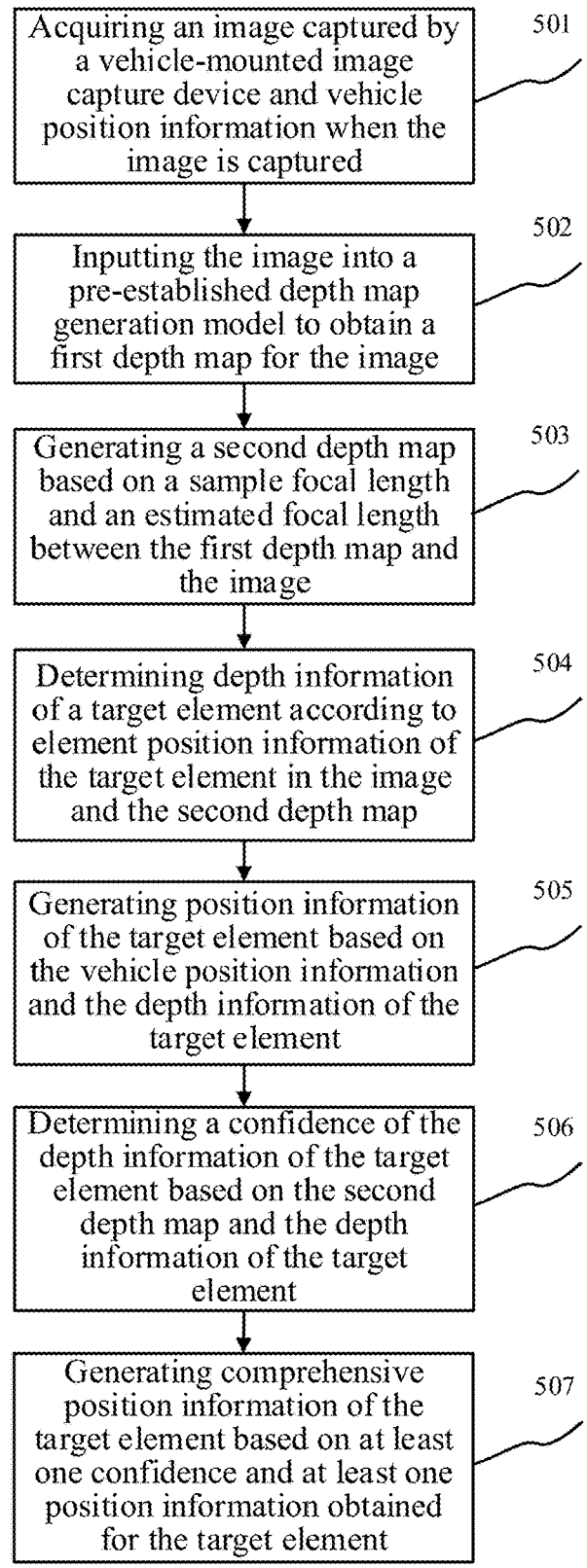
FIG. 5 is a flowchart of another embodiment of a method for generating position information according to the present disclosure.

Further referring to FIG. 5, a flow 500 of another embodiment of a method for generating position information is shown. The flow 500 of the method for generating position information includes the following steps:

Step 501: acquiring an image captured by a vehicle-mounted image capture device and vehicle position information during capturing the image.

In this embodiment, step 501 is similar to step 201 of the embodiment shown in FIG. 2, and details are not described herein again.

Step 502: inputting the image into a pre-established depth map generation model to obtain a first depth map for the image.

In this embodiment, step 502 is similar to step 202 of the embodiment shown in FIG. 2, and details are not described herein again.

Step 503: generating a second depth map based on a sample focal length, the first depth map, and an estimated focal length of the image.

In this embodiment, step 503 is similar to step 203 of the embodiment shown in FIG. 2, and details are not described herein again.

Step 504: determining depth information of a target element according to element position information of the target element in the image and the second depth map.

In this embodiment, step 504 is similar to step 204 of the embodiment shown in FIG. 2, and details are not described herein again.

Step 505: generating position information of the target element based on the vehicle position information and the depth information of the target element.

In this embodiment, step 505 is similar to step 205 of the embodiment shown in FIG. 2, and details are not described herein again.

Step 506: determining a confidence of the depth information of the target element based on the second depth map and the depth information of the target element.

In this embodiment, the execution subject may determine the confidence of the depth information of the target element based on the second depth map and the depth information of the target element. As an example, the execution subject may first determine, based on the element position information of the target element in the image and the second depth map, a plurality of pixel values of a position corresponding to the position indicated by the element position information in the second depth map. After that, a standard deviation of reciprocals of the plurality of pixel values may be determined. Then, a reciprocal of the standard deviation may be calculated. Finally, the reciprocal of the standard deviation is multiplied by the reciprocal of the depth information of the target element, and the obtained value is used as the confidence of the depth information of the target element. Specifically, the confidence of the depth information of the target element may be calculated by the following equation:

$$conf = 1 \bigg/ \bigg( depth_{mark} * std\bigg(\frac{1}{depth_i}\bigg)\bigg)$$

Where, conf represents the confidence of the depth information of the target element; $depth_i$ represents the plurality of pixel values of the position corresponding to the position indicated by the element position information in the second depth map, and i is more than or equal to 1 and less than or equal to the number of the plurality of pixel values; and $depth_{mark}$ represents the depth information of the target element.

Step 507: generating comprehensive position information of the target element based on at least one confidence and at least one position information obtained for the target element.

In this embodiment, for the target element, the execution subject may obtain at least one confidence and at least one position information. For example, the execution subject may acquire multiple times the images including the same target element and the vehicle position information when the images are captured, and perform steps 501 to 506 multiple times to obtain a confidence and a position information each time, thereby obtaining multiple confidences and multiple position information. After that, the execution subject may generate the comprehensive position information of the target element based on the obtained multiple confidences and multiple position information. As an example, the confidence obtained each time may be used as a weight of the position information obtained in this calculation, then the weighted sum of the multiple position information is calculated, and the calculation result is used as the comprehensive position information of the target element.

It can be seen from FIG. 5 that, compared with the embodiment corresponding to FIG. 2, the flow 500 of the method for generating position information in this embodiment highlights the step of generating comprehensive position information. Therefore, the solution described in this embodiment can comprehensively consider the confidences and position information obtained multiple times when generating the position information, so that the generated comprehensive position information is more accurate.

Figure 6:
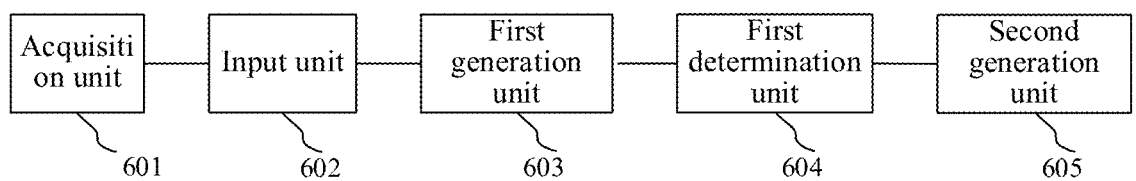
FIG. 6 is a schematic structural diagram of an embodiment of an apparatus for generating position information according to the present disclosure.

Further referring to FIG. 6, as an implementation of the method shown in the above figures, the present disclosure provides an embodiment of an apparatus for generating position information. The embodiment of the apparatus corresponds to the embodiment of the method shown in FIG. 2, and the apparatus may be applied to various electronic devices.

As shown in FIG. 6, the apparatus 600 for generating position information in this embodiment includes: an acquisition unit 601, an input unit 602, a first generation unit 603, a first determination unit 604, and a second generation unit 605. The acquisition unit 601 is configured to acquire an image captured by a vehicle-mounted image capture device and vehicle position information during capturing the image, wherein the image includes a target element belonging to a preset category; the input unit 602 is configured to input the image into a pre-established depth map generation model to obtain a first depth map for the image, wherein the focal length of sample images of sample data used during the training of the depth map generation model is a sample focal length; the first generation unit 603 is configured to generate a second depth map based on the sample focal length, the first depth map, and an estimated focal length of the image, wherein the estimated focal length of the image is generated based on the size of the image; the first determination unit 604 is configured to determine depth information of the target element according to element position information of the target element in the image and the second depth map; and the second generation unit 605 is configured to generate position information of the target element based on the vehicle position information and the depth information of the target element.

In this embodiment, the specific processing of the acquisition unit 601, the input unit 602, the first generation unit 603, the first determination unit 604, and the second generation unit 605 of the apparatus 600 for generating position information and the technical effects achieved may be referred to relevant descriptions of step 201, step 202, step 203, step 204, and step 205 in the corresponding embodiment of FIG. 2 respectively, and details are not described herein again.

In some optional implementation modes of this embodiment, the apparatus 600 further includes: a second determination unit (not shown), configured to determine a confidence of the depth information of the target element based on the second depth map and the depth information of the target element; and a third generation unit (not shown), configured to generate comprehensive position information of the target element based on at least one confidence and at least one position information obtained for the target element.

In some optional implementation modes of this embodiment, the depth map generation model is obtained by training in the following way: acquiring a set of sample data, wherein the sample data includes sample images and sample depth maps corresponding to the sample images; and obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

In some optional implementation modes of this embodiment, the first generation unit 603 is further configured to: determine the ratio between the estimated focal length and the sample focal length; and calculate the product of the ratio and the first depth map, and use the calculation result as the second depth map.

In some optional implementation modes of this embodiment, the vehicle position information includes latitude and longitude; and the second generation unit 605 is further configured to: determine the angle between a straight line formed by a center point of the target element and a center point of a bottom edge of the image and the bottom edge of the image as a first angle; determine the angle between the driving direction of the vehicle and the direction north as a second angle; determine a north angle of the target element according to the first angle and the second angle; and calculate the latitude and longitude of the target element according to the north angle of the target element, the latitude and longitude, and the depth information of the target element.

Hereinafter, referring to FIG. 7, a schematic structural diagram of an computer system 700 of an electronic device (for example, the server or terminal device in FIG. 1) adapted to implement the embodiments of the present disclosure is shown. The electronic device shown in FIG. 7 is merely an example, and should not limit the function and scope of use of the embodiments of the present disclosure.

Figure 7:
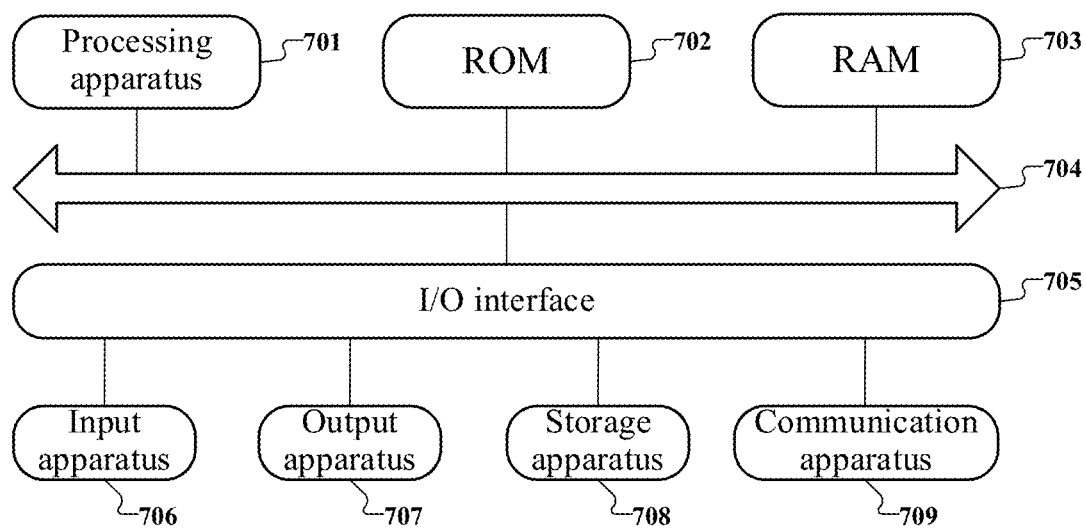
FIG. 7 is a schematic structural diagram of a computer system of an electronic device adapted to implement the embodiments of the present disclosure.

As shown in FIG. 7, the electronic device 700 may include a processing apparatus (for example, a central processing unit, a graphics processor, etc.) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses may be connected to the I/O interface 705: an input apparatus 706 including a touch screen, a touch pad, a keyboard, a mouse, a camera, a microphone, an accelerometer, a gyroscope, or the like; an output apparatus 707 including a liquid crystal display (LCD), a speaker, a vibrator, or the like; a storage apparatus 708 including a tape, a hard disk or the like; and a communication apparatus 709. The communication apparatus 709 may allow wireless or wired communication between the electronic device 700 and other device to exchange data. Although FIG. 7 illustrates the electronic device 700 having various apparatuses, it should be understood that all the illustrated apparatuses are not required to be implemented or included. More or less apparatuses may be alternatively implemented or included. Each block shown in FIG. 7 may represent an apparatus or a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 709, or may be installed from the storage apparatus 708, or may be installed from the ROM 702. The computer program, when executed by the processing apparatus 701, implements the abovementioned functionalities as defined by the method of the embodiments of the present disclosure.

It should be noted that the computer readable medium in the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wired, optical cable, RF (Radio Frequency) etc., or any suitable combination of the above.

The computer-readable medium may be included in the electronic device, or exists alone and is not assembled into the electronic device. The computer-readable medium carries one or more programs. When the one or more programs are executed by the electronic device, the electronic device is caused to: acquire an image captured by a vehicle-mounted image capture device and vehicle position information during capturing the image, wherein the image comprises a target element belonging to a preset category; input the image into a pre-established depth map generation model to obtain a first depth map for the image, wherein the focal length of sample images of sample data used during the training of the depth map generation model is a sample focal length; generate a second depth map based on the sample focal length, the first depth map, and an estimated focal length of the image, wherein the estimated focal length of the image is generated based on the size of the image; determine depth information of the target element according to element position information of the target element in the image and the second depth map; and generate position information of the target element based on the vehicle position information and the depth information of the target element.

A computer program code for performing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, an input unit, a first generation unit, a first determination unit, and a second generation. Here, the names of these units do not in some cases constitute limitations to such units themselves. For example, the acquisition unit may also be described as "a unit for acquiring an image captured by a vehicle-mounted image capture device and vehicle position information during capturing the image".

The above description only provides an explanation of the preferred embodiments of the present disclosure and the technical principles used. It should be appreciated by those skilled in the art that the inventive scope of the embodiments of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the embodiments of the present disclosure are examples.

What is claimed is:

1. A method for generating position information, comprising:
    acquiring an image captured by a vehicle-mounted image capture device and vehicle position information during capturing the image, wherein the image comprises a target element belonging to a preset category;
    inputting the image into a pre-established depth map generation model to obtain a first depth map for the image, wherein the focal length of sample images of sample data used during the training of the depth map generation model is a sample focal length;
    generating a second depth map based on the sample focal length, the first depth map, and an estimated focal length of the image, wherein the estimated focal length of the image is generated based on the size of the image;
    determining depth information of the target element according to element position information of the target element in the image and the second depth map; and
    generating position information of the target element based on the vehicle position information and the depth information of the target element;
    wherein the depth map generation model is obtained by training in the following way:
    acquiring a set of sample data, wherein the sample data comprises sample images and sample depth maps corresponding to the sample images; and
    obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

2. The method according to claim 1, wherein the method further comprises:
    determining a confidence of the depth information of the target element based on the second depth map and the depth information of the target element; and
    generating comprehensive position information of the target element based on at least one confidence and at least one position information obtained for the target element.

3. The method according to claim 1, wherein the generating a second depth comprises:

determining a ratio between the estimated focal length and the sample focal length; and calculating a product of the ratio and the first depth map, and using the calculation result as the second depth map.

4. The method according to claim 1, wherein the vehicle position information comprises latitude and longitude; and the generating position information of the target element comprises:

determining an angle between a straight line formed by a center point of the target element and a center point of a bottom edge of the image and the bottom edge of the image as a first angle;

determining an angle between the driving direction of the vehicle and the direction north as a second angle;

determining a north angle of the target element according to the first angle and the second angle; and calculating the latitude and longitude of the target element according to the north angle of the target element, the latitude and longitude, and the depth information of the target element.

5. A device, comprising:
one or more processors; and
a storage apparatus, storing one or more programs thereon,
wherein the one or more programs, when executed by the one or more processors, cause the one or more processors to perform an operation for searching a video segment, comprising:

acquiring an image captured by a vehicle-mounted image capture device and vehicle position information during capturing the image, wherein the image comprises a target element belonging to a preset category;

inputting the image into a pre-established depth map generation model to obtain a first depth map for the image, wherein the focal length of sample images of sample data used during the training of the depth map generation model is a sample focal length;

generating a second depth map based on the sample focal length, the first depth map, and an estimated focal length of the image, wherein the estimated focal length of the image is generated based on the size of the image;

determining depth information of the target element according to element position information of the target element in the image and the second depth map; and generating position information of the target element based on the vehicle position information and the depth information of the target element;

wherein the depth map generation model is obtained by training in the following way:

acquiring a set of sample data, wherein the sample data comprises sample images and sample depth maps corresponding to the sample images; and obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

6. The device according to claim 5, wherein the operation further comprises:

determining a confidence of the depth information of the target element based on the second depth map and the depth information of the target element; and generating comprehensive position information of the target element based on at least one confidence and at least one position information obtained for the target element.

7. The device according to claim 5, wherein the generating a second depth comprises:

determining a ratio between the estimated focal length and the sample focal length; and calculating a product of the ratio and the first depth map, and using the calculation result as the second depth map.

8. The device according to claim 5, wherein the vehicle position information comprises latitude and longitude; and the generating position information of the target element comprises:

determining an angle between a straight line formed by a center point of the target element and a center point of a bottom edge of the image and the bottom edge of the image as a first angle;

determining an angle between the driving direction of the vehicle and the direction north as a second angle;

determining a north angle of the target element according to the first angle and the second angle; and calculating the latitude and longitude of the target element according to the north angle of the target element, the latitude and longitude, and the depth information of the target element.

9. A non-transitory computer-readable medium, storing a computer program thereon, wherein the program, when executed by a processor, causes the processor to perform an operation for searching a video segment, comprising:

acquiring an image captured by a vehicle-mounted image capture device and vehicle position information during capturing the image, wherein the image comprises a target element belonging to a preset category;

inputting the image into a pre-established depth map generation model to obtain a first depth map for the image, wherein the focal length of sample images of sample data used during the training of the depth map generation model is a sample focal length;

generating a second depth map based on the sample focal length, the first depth map, and an estimated focal length of the image, wherein the estimated focal length of the image is generated based on the size of the image;

determining depth information of the target element according to element position information of the target element in the image and the second depth map; and generating position information of the target element based on the vehicle position information and the depth information of the target element;

wherein the depth map generation model is obtained by training in the following way:

acquiring a set of sample data, wherein the sample data comprises sample images and sample depth maps corresponding to the sample images; and obtaining the depth map generation model by training using a pre-built loss function with the sample images in the set of sample data as input and the sample depth maps corresponding to the input sample image as desired output, wherein the loss function is a weighted sum of a first loss function, a second loss function and a third loss function, the first loss function is obtained based on the model output and the desired output, the second loss function is obtained based on the gradient of the model output and the gradient of the desired output, and the third loss function is obtained based on the similarity between the model output and the desired output.

10. The medium according to claim 9, wherein the operation further comprises:
   determining a confidence of the depth information of the target element based on the second depth map and the depth information of the target element; and
   generating comprehensive position information of the target element based on at least one confidence and at least one position information obtained for the target element.

11. The medium according to claim 9, wherein the generating a second depth comprises:
   determining a ratio between the estimated focal length and the sample focal length; and
   calculating a product of the ratio and the first depth map, and using the calculation result as the second depth map.

12. The medium according to claim 9, wherein the vehicle position information comprises latitude and longitude; and
   the generating position information of the target element comprises:
   determining an angle between a straight line formed by a center point of the target element and a center point of a bottom edge of the image and the bottom edge of the image as a first angle;
   determining an angle between the driving direction of the vehicle and the direction north as a second angle;
   determining a north angle of the target element according to the first angle and the second angle; and
   calculating the latitude and longitude of the target element according to the north angle of the target element, the latitude and longitude, and the depth information of the target element.

\* \* \* \* \*